US007035585B2

(12) United States Patent
Forman et al.

(10) Patent No.: US 7,035,585 B2
(45) Date of Patent: Apr. 25, 2006

(54) SYSTEM AND METHOD FOR INTERFACING SATELLITE COMMUNICATIONS WITH AIRCRAFT

(75) Inventors: Robert M. Forman, Keller, TX (US); Christopher S. Mengis, Fort Worth, TX (US); Anthony J. Schiavone, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 442 days.

(21) Appl. No.: 10/149,311

(22) PCT Filed: Dec. 11, 2000

(86) PCT No.: PCT/US00/33516

§ 371 (c)(1),
(2), (4) Date: Jun. 10, 2002

(87) PCT Pub. No.: WO01/43308

PCT Pub. Date: Jun. 14, 2001

(65) Prior Publication Data

US 2003/0008611 A1    Jan. 9, 2003

(51) Int. Cl.
*H04H 1/00* (2006.01)

(52) U.S. Cl. ............... 455/3.02; 455/557; 455/427; 455/431

(58) Field of Classification Search ........... 455/3.01, 455/3.02, 188.1, 12.1, 13.1, 431, 84, 129, 455/140, 427, 432.2, 414.1, 557; 375/200, 375/18; 701/29; 342/29
See application file for complete search history.

(56) References Cited

U.S. PATENT DOCUMENTS

| 5,463,656 | A | * | 10/1995 | Polivka et al. ............. 375/130 |
| 5,572,216 | A | * | 11/1996 | Weinberg et al. ....... 342/357.06 |
| 5,931,877 | A | * | 8/1999 | Smith et al. ................... 701/29 |
| 6,020,845 | A | * | 2/2000 | Weinberg et al. ........... 342/354 |
| 6,044,323 | A | * | 3/2000 | Yee et al. ..................... 701/120 |
| 6,072,994 | A | * | 6/2000 | Phillips et al. ................. 455/84 |
| 6,591,084 | B1 | * | 7/2003 | Chuprun et al. ............ 455/3.05 |
| 6,650,897 | B1 | * | 11/2003 | Nelson ........................ 455/431 |
| 6,741,841 | B1 | * | 5/2004 | Mitchell ................... 455/188.1 |
| 2002/0028038 | A1 | * | 3/2002 | Parker .......................... 385/24 |
| 2003/0067906 | A1 | * | 4/2003 | Young ......................... 370/347 |

(Continued)

FOREIGN PATENT DOCUMENTS

EP    0 915 577 A2    5/1999

(Continued)

OTHER PUBLICATIONS

*Avionics Architecture Study for Air Mobility Command Aircraft*; B. E. White, pp. 3.2-1 through 3.2-7; 1997 IEEE.

(Continued)

*Primary Examiner*—Tilahun Gesesse
*Assistant Examiner*—Tan Trinh
(74) *Attorney, Agent, or Firm*—Koestner Bertani, LLP

(57) ABSTRACT

A system for interfacing commercial satellite communications technology with military aircraft communications systems is disclosed. The system includes an off-board commercial transceiver and an onboard commercial transceiver for communicating data to a commercial satellite network. The system also includes an onboard interface unit which is configured to communicate data between the onboard transceiver and the aircraft's communication system. The onboard interface unit includes a computer processor which executes a software program stored on an electronic medium. The software program includes instructions for sending data to and receiving data from the onboard commercial transceiver and for sending data to and receiving data from the onboard communications system.

32 Claims, 10 Drawing Sheets

U.S. PATENT DOCUMENTS

2003/0122701 A1* 7/2003 Tran .......................... 342/29

FOREIGN PATENT DOCUMENTS

EP            0 915 577 A3     3/2000
GB           2310973 A       9/1997

OTHER PUBLICATIONS

Foshee, J.J., "Tactical Satellite Communications Experiment", Air Force Write Aeronautical Laboratories, pp. 117-121.

Plies, J.B., et al., "CNS/ATM Avionics for a Militarized Commercial Transport", IEEE 1995, pp. 7-12.

Lovett, Andy, "Satellite Communications Today, Tomorrow and In the Next Decade", Institution of Electrical Engineers 1997, pp. 1-9.

Cummings, D., "Military Aeronautical Satellite Communications", IEE Proceedings, vol. 133, No. 4, Jul. 1986, pp. 411-419.

* cited by examiner

SYSTEM AND METHOD FOR INTERFACING SATELLITE COMMUNICATIONS WITH AIRCRAFT

TECHNICAL FIELD OF THE INVENTION

The present invention relates generally to communications systems and, more particularly, to interfacing non-commercial communications systems with commercial communications systems. Even more particularly, the present invention relates to a system for interfacing commercial satellite communications technology with non-commercial aircraft communications technology.

BACKGROUND OF THE INVENTION

The technological complexity of communications equipment has increased dramatically over the past several decades. As users become more sophisticated, there is a growing need to communicate large amounts of data between various users. This is particularly true of tactical aircraft. Real-time information to the cockpit ("RTIC") provides real-time situation data to a pilot, allowing the pilot to asses situations as they unfold and respond to real-time opportunities. Because pilots, and those coordinating their operations, have increased situational awareness, the efficiency and success of missions are increased.

Currently, real-time data is transmitted from ground locations to tactical aircraft and their pilots via data links (JTIDS), direct broadcast links (TRAP/TDDS), weapons video links (AGM-130/Walleye) and the Improved Data Modem (IDM). Each of these communications systems employed presents severe limitations for data transfer to and from a tactical aircraft. The broadcast links are one-way, thus preventing effective communication by the pilot with operations, ground units or other aircraft. Additionally, one-way broadcast technologies do not allow other units to dynamically request and pull data from the tactical aircraft. Other systems, based on UHF technology, are limited to line-of-sight communications. Low terrain often blocks low-elevation-angle, line-of-sight, direct communications with these tactical aircraft. This is particularly dangerous for units that are "hunkered down" for self-protection and require expeditious air support.

Current military satellite technologies, which overcome many of the problems associated with line-of-sight, also present limitations. Global Broadcast Satellite ("GBS"), a system of direct broadcast technology, is currently used to provide tactical data to aircraft. However, a GBS systems cannot be effectively integrated into small tactical aircraft. Moreover, Military SATCOM systems are currently over-subscribed and lack sufficient bandwidth to accommodate significant data traffic increases. Thus, it is not practical to support thousands of individual tactical units over the existing Military SATCOM architecture.

Current systems of providing real-time data to tactical units also present significant budgetary and weight limitations. Launching additional satellites to increase bandwidth is expensive, as is developing transceivers to work with new satellite networks. Additionally, military off-the-shelf transceivers are bulky and cannot be easily adapted to small and agile fighter jets.

Therefore, there is a need to investigate the feasibility of using commercial satellite communication systems to provide an affordable, over-the-horizon (OTH), two-way, voice and data communication capability for tactical fighters as a means to augment current communication capabilities.

SUMMARY OF THE INVENTION

The present invention provides a system to integrate commercial satellite communications technology with tactical aircraft communications technology. This invention provides substantial advantages over conventional communications systems and methods.

One embodiment of the present invention discloses a system to integrate commercial satellite communications technology with tactical communications technology. The system includes an off-board commercial transceiver and an onboard commercial transceiver for communicating data to a commercial satellite network. The system also includes an onboard interface unit configured to communicate data between the onboard transceiver and the aircraft's communication system. The onboard interface unit includes a computer processor which executes a software program stored within an electronic medium. The software program includes instructions for sending data to and receiving data from the onboard commercial transceiver and for sending data to and receiving data from the onboard communications system.

Another aspect of the invention provides a method for integrating commercial satellite communication technology with tactical aircraft communications technology. The method includes communicating two-way data with a SATCOM network from an off-board source. This two-way data is communicated with the SATCOM network from an onboard commercial transceiver. The data is then processed to an onboard interface unit from the onboard transceiver. The data is processed at the interface unit and communicated with an onboard communications system.

The present invention provides an important technical advantage by presenting enhanced two-way communication capability. Two-way communication is possible because the onboard transceiver can both send and receive data from a commercial satellite network.

The present invention provides another important technical advantage by avoiding the limitations of traditional line-of-sight communications methods. Terrains that often block low-elevation-angle line-of-sight communications can be overcome by allowing users, such as a ground unit, to relay information to tactical aircraft via satellite. Because satellite communications are used, low-elevation-angles are avoided. A corollary advantage of extending communication beyond line-of-sight or over-the-horizon is that data acquisition can occur much earlier.

Yet another advantage provided by the present invention is to allow increased real-time communication while an aircraft is enroute. Headquarters, ground units and other air units are able to communicate data in real-time. Thus, the tactical unit has an increased awareness of unfolding events. This allows tactical units to assimilate and assess situation data and perform advanced planning. The tactical units can receive briefings, location data, and digital images from other users while the unit is miles from the target.

Another advantage of the present invention allows a user to communicate, in real-time, target assessment and situation data directly to air operations commanders (AOC). These personnel may be thousands of miles away. Because AOCs receive real-time data, they can dynamically adjust mission assignments of enroute tactical units. The tactical aircraft can also provide digital information, such as designated aim point location at weapon release and available target-system imagery, prior to weapon impact. The communication of data to operations leads to the overall efficiency of missions being greatly increased.

The present invention provides yet another advantage by making feasible the effective management of widely distributed, on-call, air-interdiction or search and rescue assets. Operations can direct various available aircraft spread over hundreds of miles to respond to real-time targeting opportunities. By increasing the overall effectiveness of search and rescue operations. A tactical aricraft can communicate damage and ejection data to operations or other aircraft. Additionally, search and rescue units will be able to communicate over a much larger range.

The present invention provides yet another technical advantage in that the use of these commercial communications routes increase the available bandwidth for communications. Additionally, since commercial satellite communications equipment is lighter than military equipment and lower in cost than other non-commercial communications systems, tactical aircraft cost and weight concerns are lessened.

BRIEF DESCRIPTION OF THE DRAWINGS

For a more complete understanding to the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The present invention comprises a system to integrate commercial satellite communications technology with military aircraft communications technology that can provide an efficient, low-cost, light-weight means for communicating real-time data to pilots.

Figure 1:
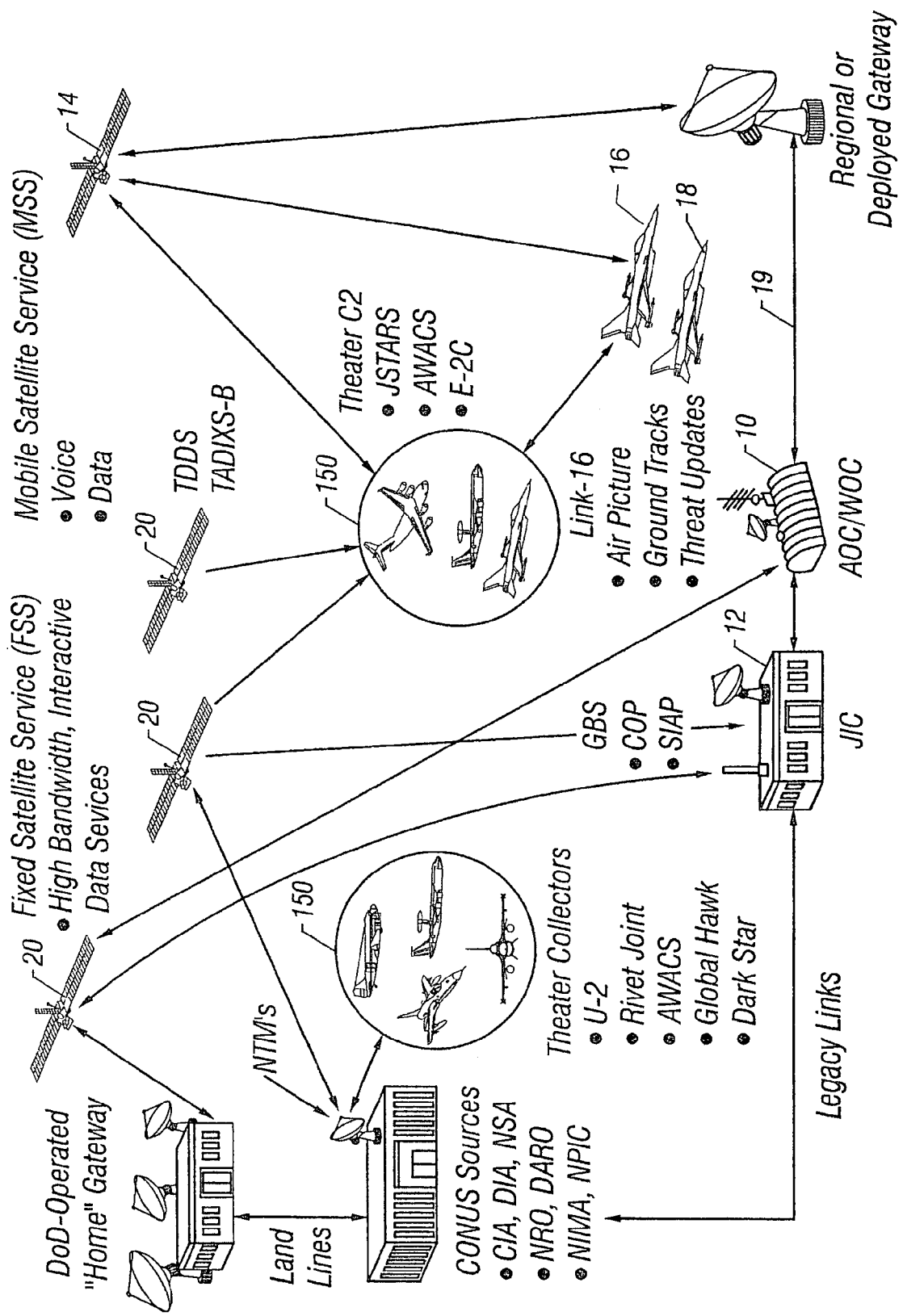
FIG. 1 depicts a diagram of one embodiment of the present invention that integrates commercial satellite communications technology with military technology.

FIG. 1 is a diagram of one embodiment of the method for integrating commercial satellite communications technology with military technology of this invention. An Air Operations Command (AOC) 10 or a ground unit (GU) 12 can communicate with a commercial satellite network 14 via an off-board transceiver 30 shown in FIG. 2. AOC 10 and GU 12 communicate mission data, weather information, voice data, objective data and other data 19 to tactical aircraft 18. While only one off-board transceiver 30 is shown for simplicity, it should be understood that there can be many off-board commercial transceivers 30. Satellite network 14, as shown, may comprise a constellation of multiple satellites 20. Satellites 20 relay data 19 across satellite network 14 until data 19 reaches a satellite 20 that can communicate with destination aircraft 18. This allows data 19 to be communicated over large distances, well beyond line-of-sight. Aircraft 18 receives data 19 at an onboard commercial satellite transceiver 30, via an antenna. Data 19 is then communicated from commercial satellite transceiver 30 to an onboard interface unit 36. Because commercial satellite transceiver can be a commercial off-the-shelf transceiver, there will be significant cost savings.

The onboard interface unit 36 can process the data and communicate the appropriate data to a mission data processor 28, which may be a fire control computer, a multi-function display set 32, a display 34, a radio 37 or intercom 38. Display 34 may be a commercial SVGA display, while the radio 37 may be a UHF/VHF radio. Onboard interface unit 36 can also send data 19 to onboard commercial satellite transceiver 30 to be communicated back to AOC 10 or the GU 12, via commercial satellite network 14 and off-board commercial transceiver 30. A pilot in aircraft 18 can send digital images, target data, voice data, search and rescue data or any other data 19 which may be required. Because the system uses two-way technology, AOC 10 can pull data from an individual aircraft 18. This provides a significant advantage over current broadcast satellite systems.

Figure 2:
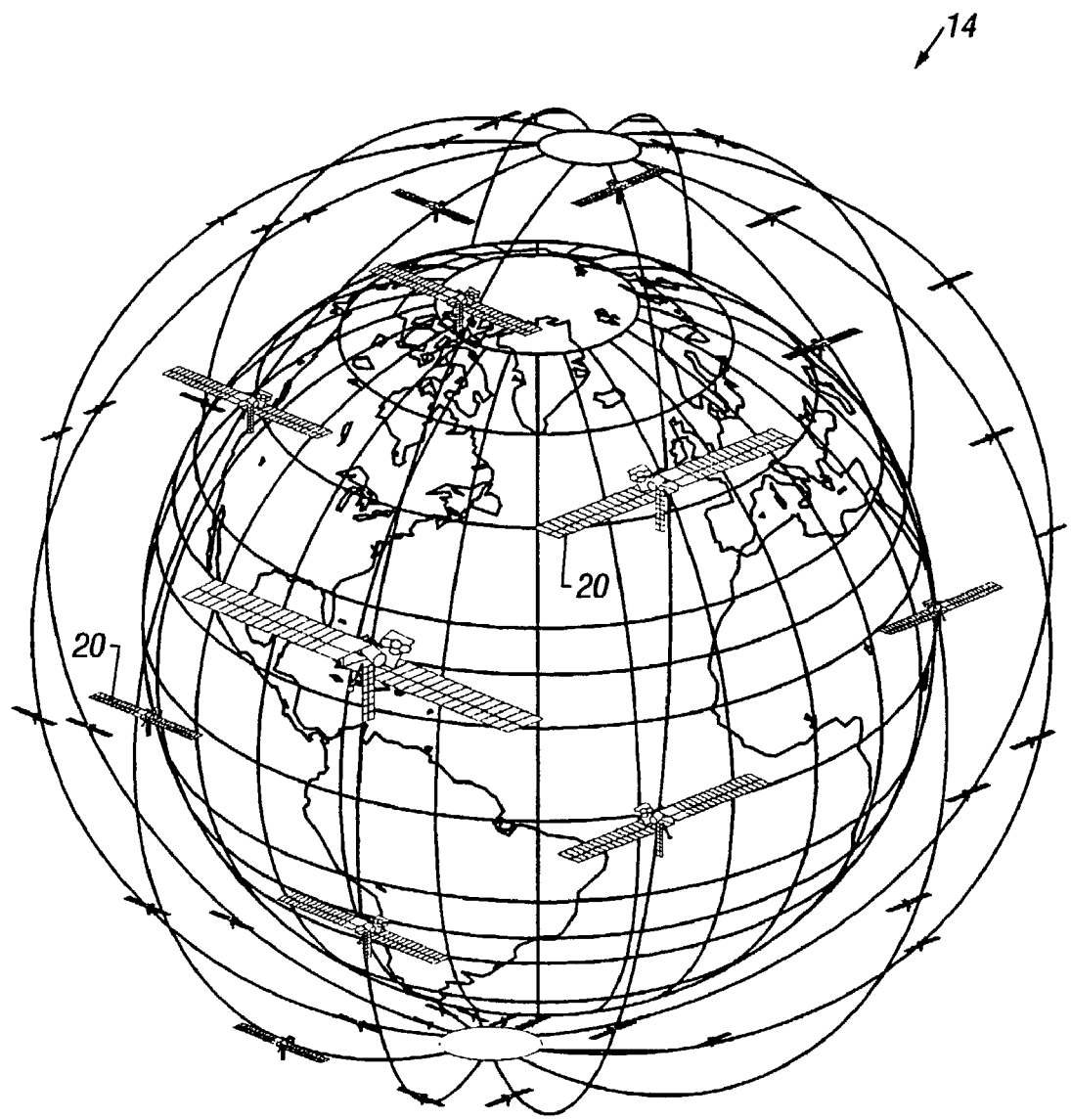
FIG. 2 depicts a more detailed view of a commercial satellite network.

FIG. 2 shows a more detailed view of a commercial satellite network 14. Satellite network 14 may comprise a constellation of low earth orbiting satellites. Each satellite 20 in the constellation is interconnected to its neighbors by high-speed cross links. These satellites 20 form an orbiting network that allows communications to be established across large distances. Some areas not accessible to more conventional communications are accessible via satellites 20. Several commercial satellite systems are available including, but not limited to, ECCO, Ellipso, E-Sat, FAI-SAT, Globalstar, ICO Iridium, LeoOne, ORBCOMM, SkyBridge and Teledesic. Using these systems is particularly advantageous because the launch and operations costs for these satellites are borne by the commercial sector while the government only pays for the bandwidth it uses. Additionally, commercial satellite networks have significantly greater available bandwidth than Military SATCOM.

Figure 3:
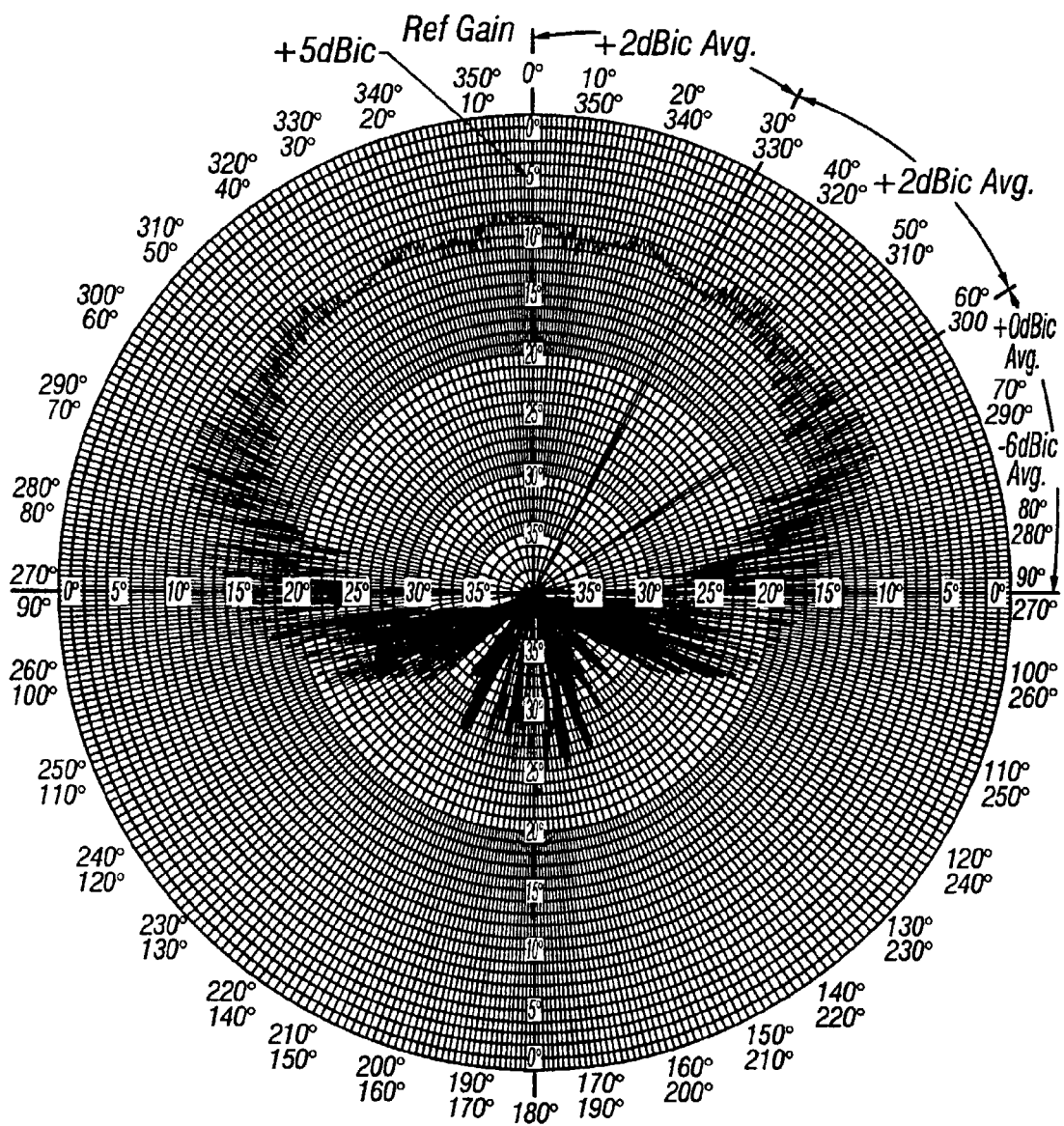
FIG. 3 provides an example gain pattern of a commercially available SATCOM antenna.

FIG. 3 depicts one such gain pattern of an off-the-shelf iridium receiver and antenna. There are many emerging commercial satellite communication systems that may have applicability for integration into tactical aircraft. Several of these systems are already operational and many more will become operational before the year 2002. Low-and Medium-earth Orbi (LEO/MEO) systems as well as Geosynchronous Orbit (GEO) systems have been investigated. Initial results indicate that the LEO and MEO systems can readily be integrated into small fighter aircraft. These systems are tailored to provide low-cost, low bandwidth services (i.e., voice, data, fax and paging). Therefore, the equipment required to receive these services is generally low weight, low cost, and requires only a small, omni-directional antenna. The GEO systems, however, are tailored to provide high bandwidth data services (e.g., Internet access, multimedia, video teleconferencing, etc.) primarily to fixed users. GEO systems generally require large, stabilized, and steerable antennas and are more suitable for fixed installations, such as an AOC 10. Therefore, the disclosed embodiments focus on LEO and MEO commercial communications systems.

Information on the various near-term commercial satellite communication system is provided in TABLE 1. Data items collected include: system type, initial operational capability (IOC) date, architecture, bandwidth, earth coverage, operating frequency, multiple access scheme, security provisions, signal propagation delay, etc. A top-level analysis performed on the systems indicate how well they met the potential requirements based on the information collected. Analysis indicated that the voice and data messaging systems (ECCO, Ellipso, Globalstar, ICO, and Iridium) are best suited for tactical airborne applications. Iridium is also the first commercial LEO SATCOM system to become operational that supports both voice and data.

Figure 4:
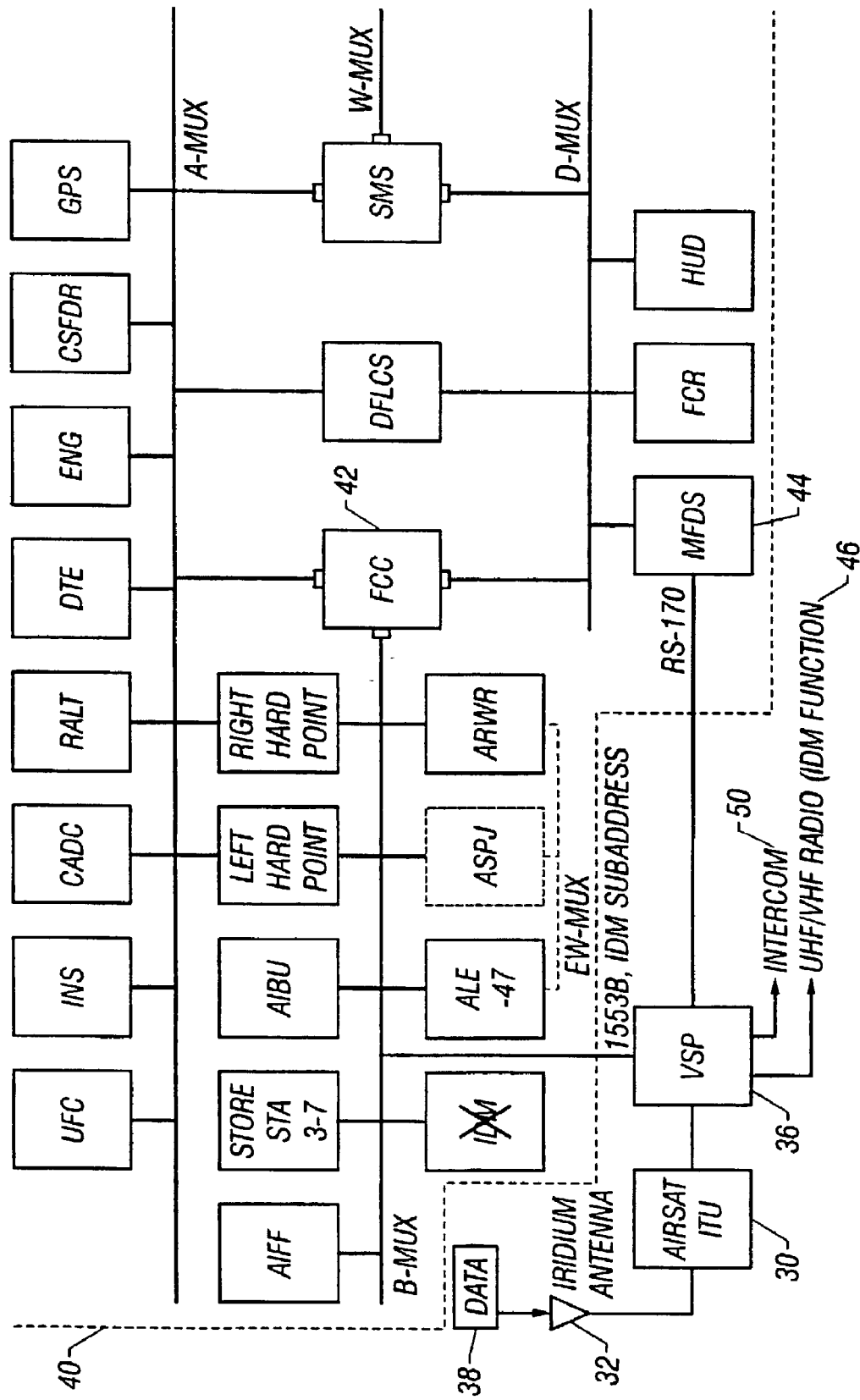
FIG. 4 illustrates an overview diagram of one embodiment of a system for integrating commercial satellite communications technology with military aircraft communications technology.

FIG. 4 depicts an overview of one embodiment of the present invention. FIG. 4 depicts a system for integrating commercial satellite communications technology with tactical aircraft communications technology. Communications are received by an onboard commercial transceiver 30, via an external antenna 32. While only one external antenna 32 is shown in FIG. 3, several may be used. By using more than one external antenna 32 in various places on an aircraft's body, transmissions are less likely to be dropped as aircraft 34 engages in complex and dynamic maneuvers such as steep climbs or rolls. Onboard commercial transceiver 30 may be a commercial off-the-shelf transceiver, such as the Iridium system's AIRSAT-1 transceiver. By using off-the-

TABLE 1

NEAR TERM LEO/MEO COMMERCIAL SATCOM SYSTEMS

| System | IOC | Type | Preimary Usage | Earth Coverage | Data Rate | Freq. Band | Multiple Access |
|---|---|---|---|---|---|---|---|
| ECCO | 2001 | LEO | Voice, Data, Fax, GPS | 70° S to 70° N | 9.6K | L/S | CDMA |
| Ellipso | 2001 | MEO | Vocie, Data, Fax, GPS | 40° S to 70° N | 9.6K | L/S | CDMA |
| E-Sat | 2001 | LEO | Remote Monitoring | North America | — | VHF | CDMA |
| FAISAT | 2002 | LEO | E-Mail, Voice-Mail, Alerts | 70° S to 70° N | 19.2K | VHF | TDMA |
| Globalstar | 1999 | LEO | Voice, Data, Fax, Paging | 70° S to 70° N | 9.6K | L/S | CDMA |
| ICO | 2000 | MEO | Voice, Data, Fax | Global | 38.4K | L | TDMA |
| Iridium | Op | Leo | Voice, Data, Fax, Paging | Global | 2.4K | L | TDMA |
| LeoOne | 2000 | LEO | Vehicle, Tracking, Monitoring | 65° S to 65° N | 9.6K | VHF/ UHF | FDMA/ TDMA |
| ORBCOM M | Op | LEO | E-Mail, Tracking, Monitoring | Global | 2.4K | VHF/ UHF | FDMA/ TDMA |
| SkyBridge | 2001 | LEO | Interactive Multimedia | 68° S to 68° N | n × 2 M | Ku | — |
| Teledesic | 2002 | LEO | Interactive Multimedia | Global | 64 M | KA | TDMA |

The AIRSAT 1 (AIRSAT 1 is a registered trademark of Allied Signal), shown in FIG. 4, is current off-the-shelf equipment that provides Iridium SATCOM communications services for commercial aviation applications. AIRSAT 1 has several major advantages over the other airborne SATCOM communications systems currently operational. These are: (1) since it works with the Iridium satellite constellation, it offers true worldwide coverage and is completely interoperable with Public Switched Telephone Networks (PSTNs) worldwide; (2) the AIRSAT system is light weight, less than 20 pounds of the entire installation package; (3) the AIRSAT system can be deployed and distributed to coalition force members without concern for security or technology loss.

The AIRSAT system has been demonstrated on various aircraft and in a variety of mission applications that range from humanitarian relief operations to command and control functions. For example, the ability to provide service in the northern latitudes has led to the successful use by the Canadian Armed Forces in their P-3 and C-130 aircraft, maintaining positive contact with their crews in regions where previously no reliable communication links had been possible. Additionally, NASA installed the AIRSAT 1 system on its ER-2 aircraft (a NASA-owned U-2 derivative) with complete success to maintain communications with the crew while the aircraft operated above the Amazon basin beyond the reach of line-of-sight communication systems. NASA has also employed the AIRSAT 1 on their DC-8 and P-3 aircraft while operating over the vast ocean areas of the South Pacific, again to maintain positive and immediate contact with aircraft that were BLOS.

shelf technology, exceptional cost savings are achieved. Data can be communicated from onboard commercial transceiver 30 to an onboard interface unit 36. Onboard interface unit 36 receives and processes data 38. Subsequently, on board interface unit 36 sends data 38 to an appropriate component of the onboard communications system 40. Components may include a fire control computer 42, a multi-display set 44, a radio 42, a commercial display 48, and an intercom 50. If data 38 comprises target data, mission data may be sent to fire control computer 42 via a serial/digital bus. RS-170 video data may be sent to multi-function display set 44 or other like display. SVGA video data is sent to the commercial display 48. In this manner, a pilot is apprised of a threat through standard cockpit communications interfaces. Analog voice data can be communicated to the pilot via intercom 50 or voice data can be communicated over an improved data modem to the radio 46.

The present invention further allows a pilot to communicate data to other units. Data 38 may be communicated to onboard interface unit 36 from fire control computer 42. Such data may comprise digital images of an objective for assessment purposes. Onboard interface unit 36 processes data 38. This data is subsequently sent to onboard commercial transceiver 30. Onboard commercial transceiver 30 can then communicate with satellite network 14 via external antenna 32. Voice data can be similarly processed from aircraft intercom 50 and the radio 46. Because individual pilots can communicate data to Users 10 and 12, situational awareness is greatly increased. Information communicated by on-scene personnel can be used to more effectively determine the deployment of assets. AOC 10 can also extract data from individual aircraft 18. Thus, a pilot 54 need not be active in the communications process for the tactical advantages to be achieved. Several additional advantages are obvious. As onboard interface unit 30 communicates data to pilots via standard military communications systems, requirements for new equipment and interfaces are minimized. Furthermore, training on the present invention is nominal because users do not have to learn an entirely new communications systems and interface.

Figure 5A:
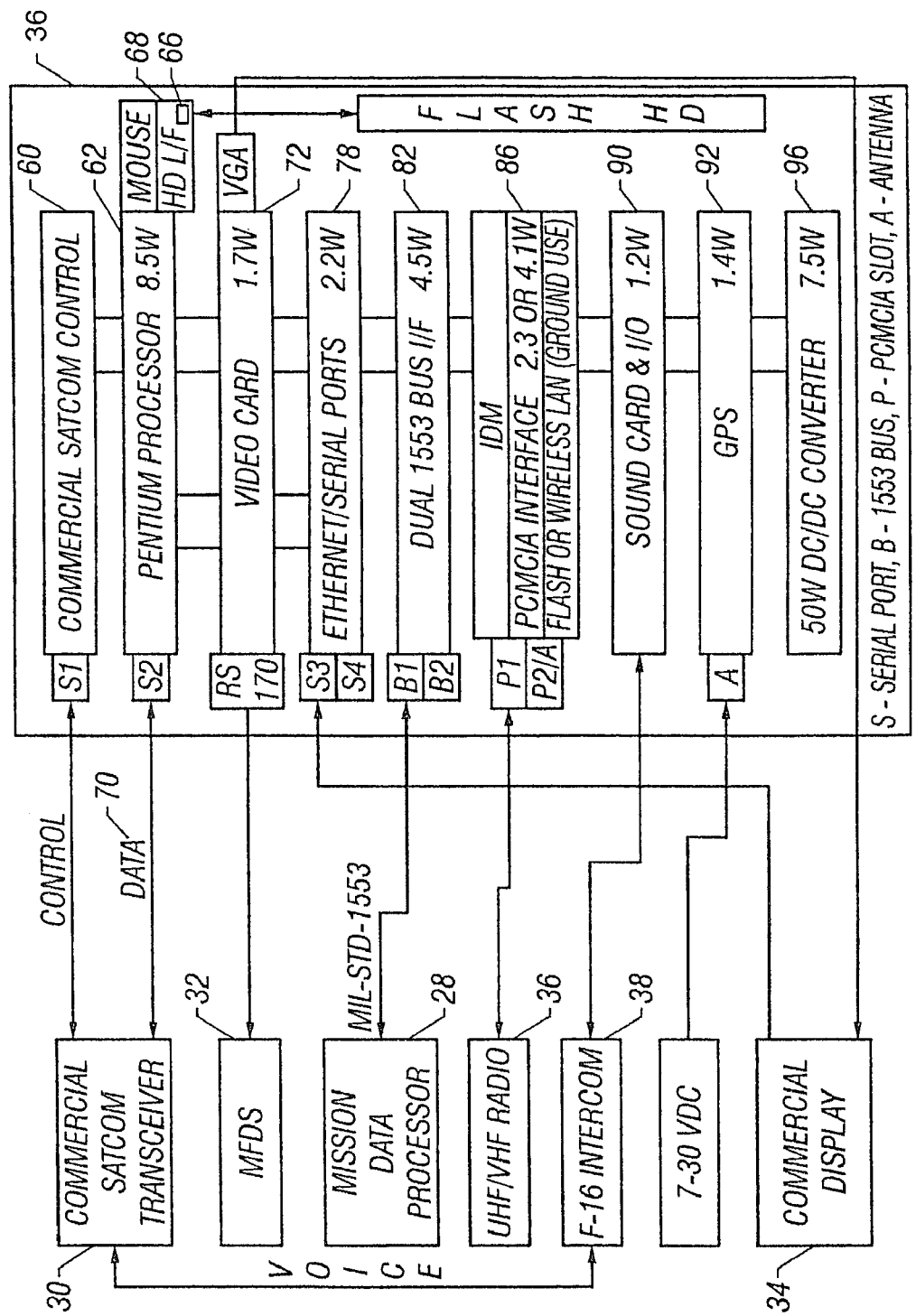
FIGS. 5A–5C provide schematic and component views of the onboard interface unit.
Figure 5B:
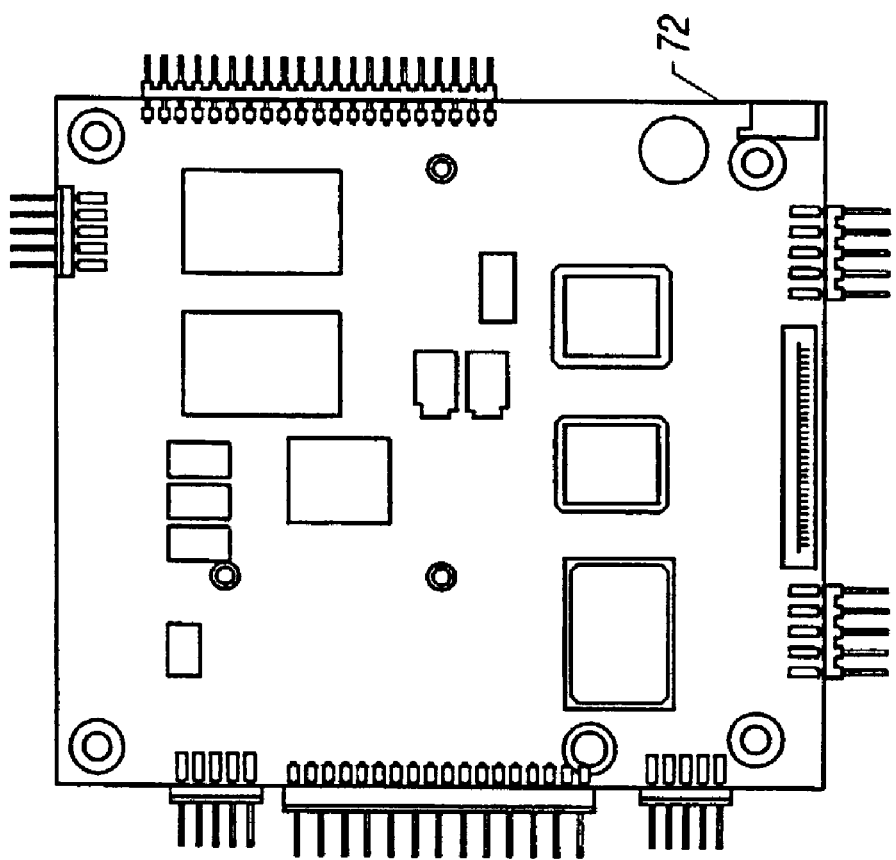
Figure 5B:
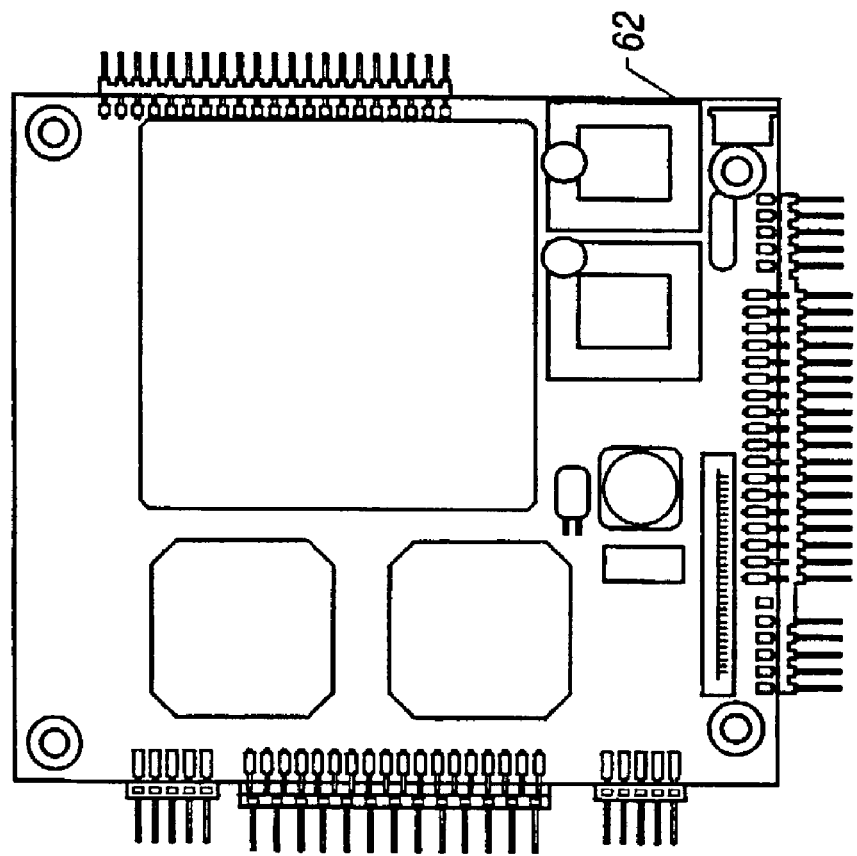
Figure 5C:
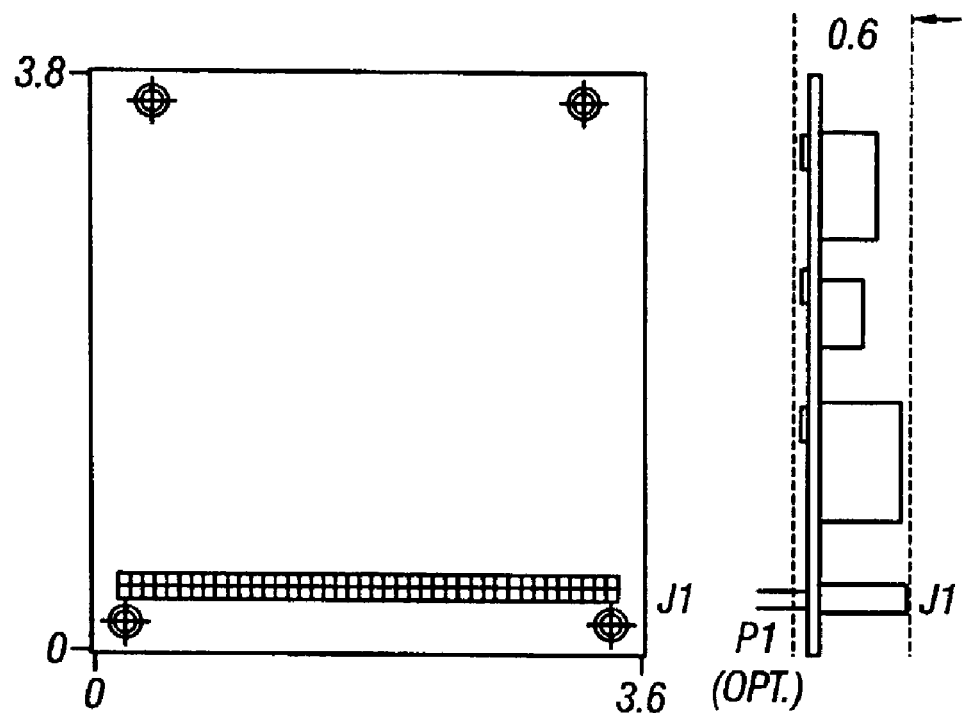
Figure 5C:
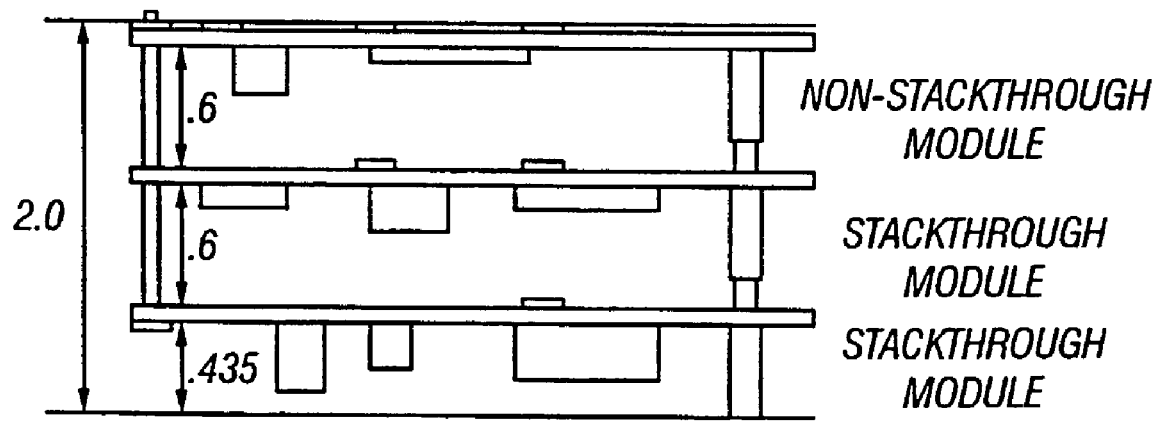

FIGS. 5A–5C show a schematic and component view of onboard interface unit 36 of FIG. 4. As discussed in conjunction with FIG. 4, the onboard interface unit 36 communicates with an onboard commercial transceiver 30 and an onboard communications system 38. In one embodiment, the onboard interface unit 36 may comprise a commercial SATCOM control 60 which communicates control and status information with the onboard commercial transceiver 30. Commercial SATCOM Control 60 also communicates data with a computer processor 62. Computer processor 62 executes a software program 66 stored on a hard drive 68. Software program 66 may comprise image processing, video generation voice recognition, speech synthesis programs and other software instructions 69. Computer processor 62 receives data 70 from onboard commercial satellite transceiver 30 and processes the data according to software instruction 66. If there is video data, computer processor 62 sends RS-170 video data via a video card 72 to a multifunction display set 32, or sends SVGA video data to a commercial display 34. Commercial display 34 can return information to computer processor 62 through an Ethernet/Serial Port 78. Two-way mission data can be communicated between computer processor 62 and mission data processor 28 via a Dual 1553 Bus 82. Two-way Voice data is communicated with the UHF/VHF radio 37 via an improved data modem 86. Two-way analog voice data is communicated to the intercom 38 via sound card 90. Onboard interface unit 36 fully integrates onboard commercial transceiver 30 with the aircraft's existing onboard communications system. Onboard interface unit 16 may also include a GPS system 92. This GPS system 92 is capable of communicating navigational information to computer processor 62. Power converter 96 converts the aircraft's regular power to power for onboard interface unit 36.

Users can send and receive real-time voice, video and mission data using the system and method of the present invention. By receiving information, users are better able to assess a situation. Since the system allows for two-way data communications, individual aircraft can send information to AOC 10. By having real-time information from the field, AOU 10 can better coordinate missions, allocate resources and assess effectiveness.

In order to preserve cost efficiencies, many components of onboard interface unit 36 can be off-the-shelf components as known to those skilled in the art. For example, computer processor 62 can be an off-the-shelf Pentium or like system. Additionally, the video card 72, sound card 90, and improved data modem 86 can be off-the-shelf items. The use of an off-the-shelf Iridium transceiver for transceiver 30 has also proved to be an effective solution.

Figure 6:
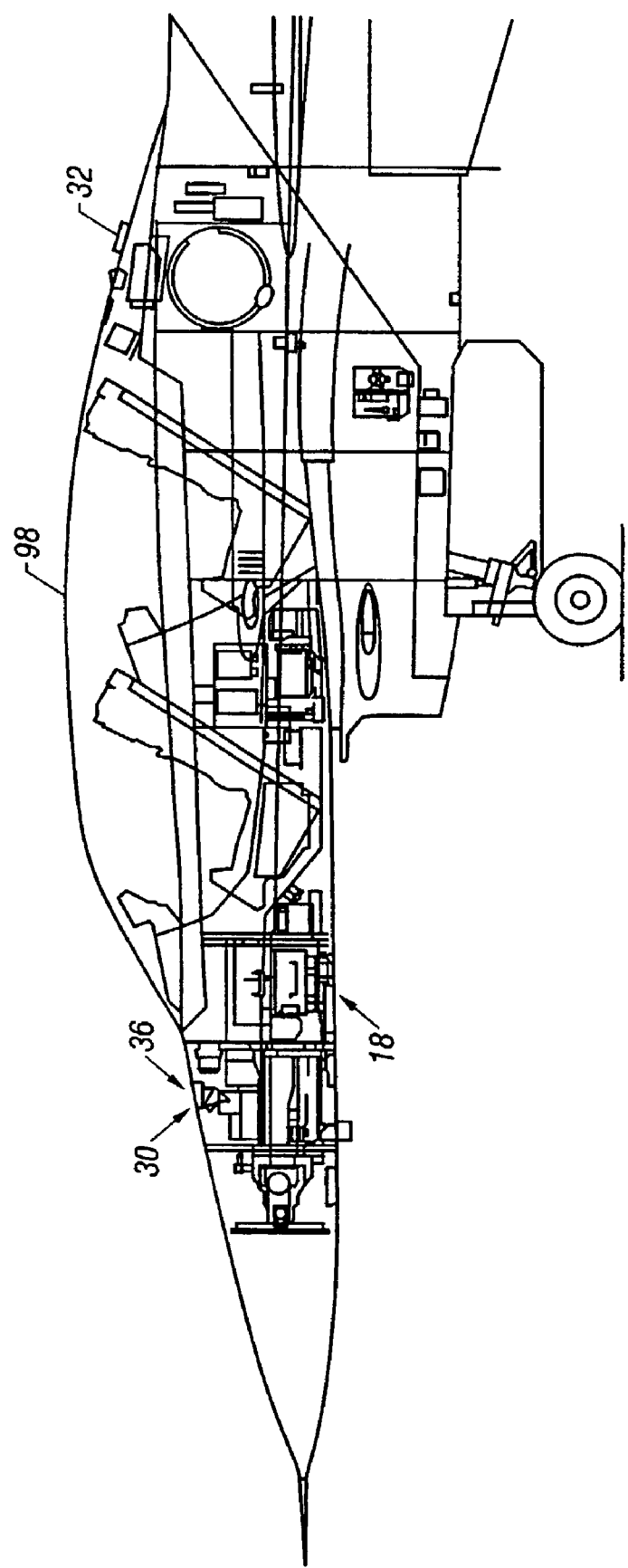
FIG. 6 shows one embodiment for mounting the onboard commercial transceiver.

FIG. 6 shows one embodiment that mounts onboard commercial transceiver 30 and onboard interface unit 36. The onboard commercial transceiver 30 is mounted below onboard interface unit 36 in front of an aircraft cockpit 98. Because the units are mounted at the front of aircraft 18, they do not add to cockpit clutter. An antenna 32 can be added to the exterior of aircraft 18 without degrading performance. In order to prevent a loss of signals during maneuvering, multiple antennas may be used at several places on the aircraft's body.

Figure 7:
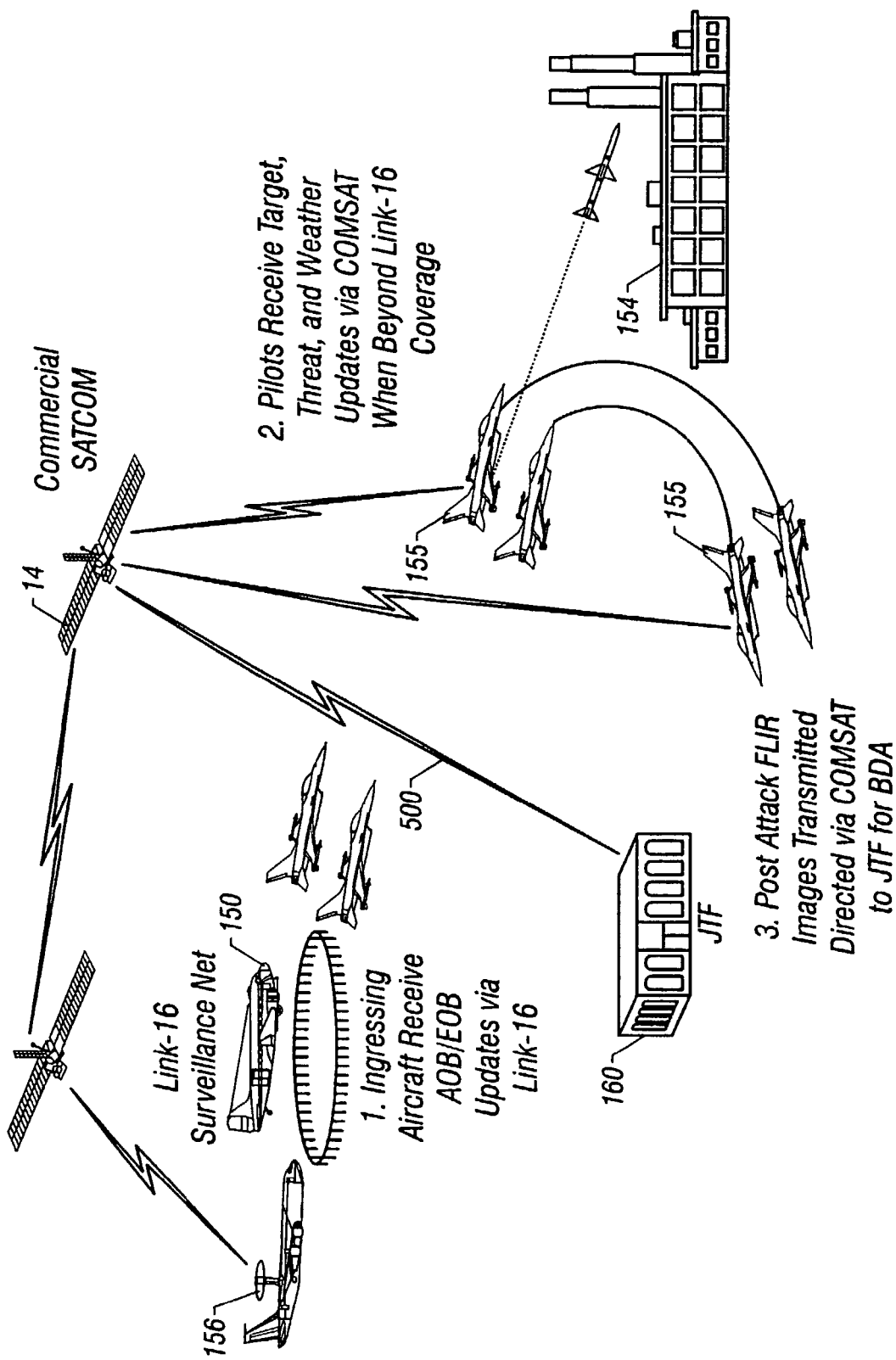
FIG. 7 provides a diagram of one possible mission using the method and system of the present invention.

FIG. 7 provides a diagram illustrating one possible use of the method of the present invention. Reconnaissance aircraft 150 collects data on a potential objective 154. Reconnaissance aircraft 150 transmits data through a Military SATCOM Satellite (not shown) to Command Center 160. Command Center 160 forwards information 150 to an airborne command center 186 to dynamically direct aircraft 155. As aircraft 155 approaches the objective location, they receive target location updates, area images and maps, weather data and threat data over a commercial satellite network. After aircraft 150 egress the target area, the aircraft 150 return bomb damage assessment information to the command center 160, using commercial satellite network 14. If aircraft 155 deployed to a first objective, they may easily be redirected to a secondary objective.

Figure 8:
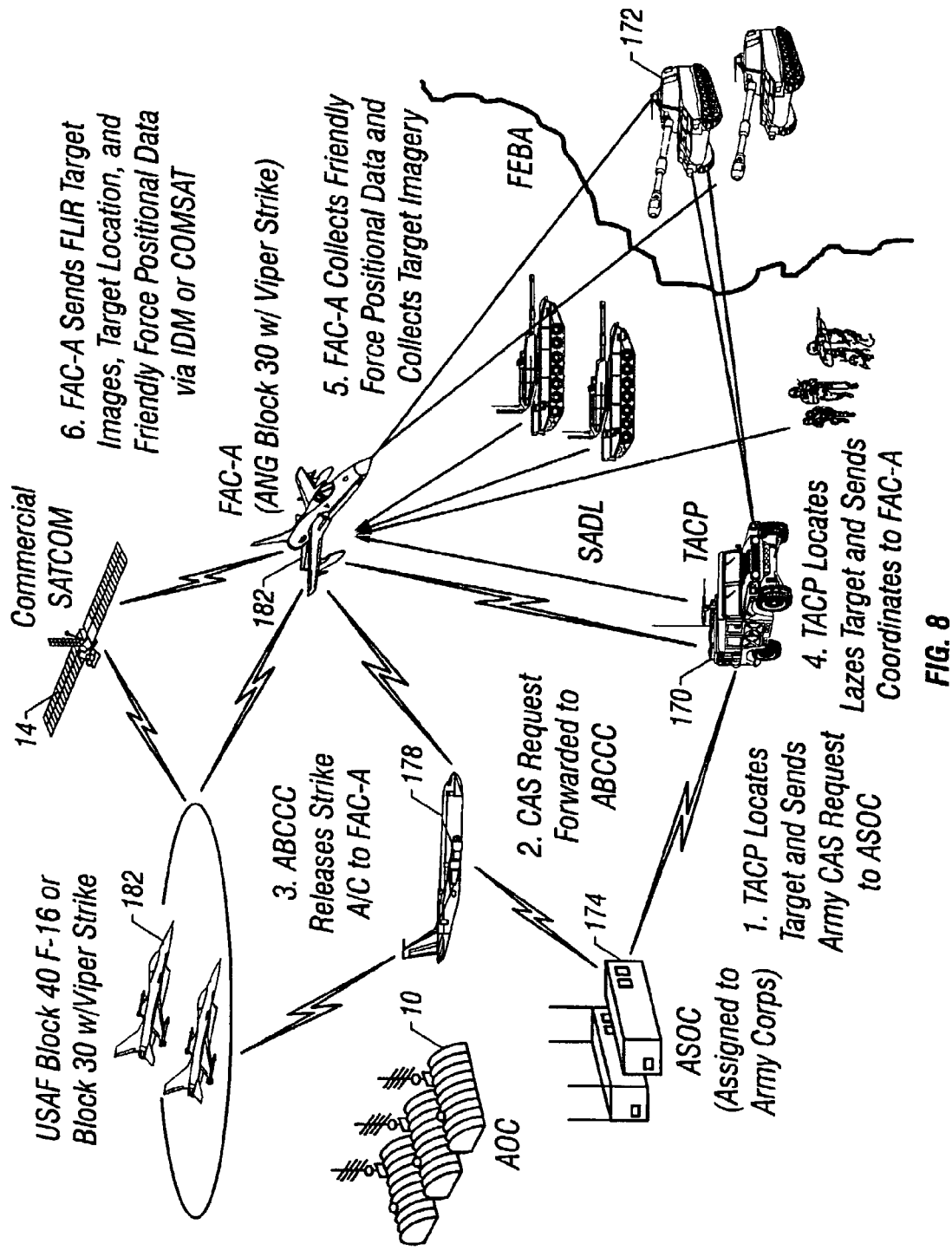
FIG. 8 is a diagram of another possible mission using the method and system of the present invention.

FIG. 8 illustrates another possible implementation of using the present invention. A ground unit 170 locates an objective 172 and reports on objective 172 to Command Center 174. Command Center 174 sends the information to a Communications Relay Aircraft 178. Forward gathered images, location and positional data is sent by aircraft 178 to other units 182 via satellite network 14. The aircraft 178 is controlled by the AOC 10. Aircraft 182 also communicates images, location, and positional data to unit 170. Unit 170 then coordinates an action with aircraft 182 and ground units. Because ground and aircrafts have real-time target data, actions can be more quickly and more efficiently coordinated. Additionally, the commercial satellite network can be used to communicate data from one aircraft to another aircraft over much greater distances than traditional communication methods allow. Thus, large combat theaters can be managed more effectively.

Tremendous satellite communication capacity will soon be available in the commercial sector. Intuitively, there are clear benefits to leveraging this commercial capability to ease the burden on military satellite communication systems and to extend satellite communication capability to tactical users who have not had access to that capability. The required equipment must be light weight and easily installed in the aircraft. And finally, the system must be easy for the pilot to use and be compatible with the other on-board avionic equipment.

One embodiment of the present invention discloses a system to integrate commercial satellite communications technology with tactical communications technology. The system includes an off-board commercial transceiver and an onboard commercial transceiver for communicating data to a commercial satellite network. The system also includes an onboard interface unit configured to communicate data between the onboard transceiver and the aircraft's communication system. The onboard interface unit includes a computer processor which executes a software program stored within an electronic medium. The software program includes instructions for sending data to and receiving data from the onboard commercial transceiver and for sending data to and receiving data from the onboard communications system.

Another aspect of the invention provides a method for integrating commercial satellite communication technology with tactical aircraft communications technology. The method includes communicating two-way data with a SATCOM network from an off-board source. This two-way data is communicated with the SATCOM network from an onboard commercial transceiver. The data is then processed to an onboard interface unit from the onboard transceiver. The data is processed at the interface unit and communicated with an onboard communications system.

The present invention provides an important technical advantage by presenting enhanced two-way communication capability. Two-way communication is possible because the onboard transceiver can both send and receive data from a commercial satellite network.

The present invention provides another important technical advantage by avoiding the limitations of traditional line-of-sight communications methods. Terrains that often block low-elevation-angle line-of-sight communications can be overcome by allowing users, such as a ground unit, to relay information to tactical aircraft via satellite. Because satellite communications are used, low-elevation-angles are avoided. A corollary advantage of extending communication beyond line-of-sight or over-the-horizon is that data acquisition can occur much earlier.

Yet another advantage provided by the present invention is to allow increased real-time communication while an aircraft is enroute. Headquarters, ground units and other air units are able to communicate data in real-time. Thus, the tactical unit has an increased awareness of unfolding events. This allows tactical units to assimilate and assess situation data and perform advanced planning. A tactical unit can receive briefings, location data, and digital images from other users while the unit is miles from the target.

Another advantage of the present invention allows a user to communicate in real-time, target assessment and situation data directly to air operations commanders (AOC). These personnel may be thousands of miles away. Because AOCs receive real-time data, they can dynamically adjust mission assignments of enroute tactical units. The tactical aircraft also provides digital information, such as designated aim point location at weapon release and available target-system imagery, prior to weapon impact. The communication of data to operations leads to the overall efficiency of missions being greatly increased.

The present invention provides yet another advantage by making feasible the effective management of widely distributed, on-call, air-interdiction or search and rescue assets. Operations can direct various available aircraft spread over hundreds of miles to respond to real-time targeting opportunities. By increasing the overall effectiveness of search and rescue operations. A tactical aricraft can communicate damage and ejection data to operations or other aircraft. Additionally, search and rescue units will be able to communicate over a much larger range.

The present invention provides yet another technical advantage, in that the use of these commercial communications routes increase the available bandwidth for communications. Additionally, since commercial satellite communications equipment is lighter than military equipment and lower in cost than other non-commercial communications systems, tactical aircraft cost and weight concerns are lessened.

The present invention uses a commercial satellite communication system in a tactical environment. These include aircraft installation, antenna requirements, link performance in a high-performance flight environment, signal detectability and exploitability, susceptibility to jamming, pilot interface and workload, and electromagnetic compatibility with existing aircraft systems. One embodiment of the present invention achieves these goals using the Iridium satellite communication system. Incorporating Iridium in the flight environment demonstrates the full capability (voice and data) of integrated avionic suite, that can be exploited in a tactical environment.

The full benefit of commercial satellite communication capabilities in tactical fighters in unknown. However, as has happened in the past, newly fielded systems often provide unpredicted utility in ways never envisioned by the original planners. Long-range communication capabilities provided by emerging commercial satellite communication (SATCOM) systems have improved effectiveness of tactical aircraft in several areas. For example, in operations with forward air controllers of special forces, commercial SATCOM offers the potential for extended and enhanced communications with units. Current UHF radio systems allow terrain to mask low-elevation-angle, line-of-sight, direct communications with in-bound tactical aircraft. In this case, on-scene target information will not be available until UHF communications are established as the tactical aircraft approach the target area. In comparison, commercial SATCOM systems have potential to greatly extend the pilot's horizon.

Although the present invention has been described in detail, it should be understood that various changes, substitutions and alterations can made hereto without departing from the spirit and scope of the invention as described by the appended claims.

What is claimed is:

1. A system that integrates satellite communications with tactical (line of sight (LOS)) aircraft communications, comprising:
   an off-board transceiver capable of exchanging two-way communications exchanging two-way communications with a first SATCOM network;
   an onboard transceiver capable of exchanging two-way communications with a second SATCOM network;
   a tactical transceiver capable of communicating two-way LOS data; and
   an onboard communication system that further comprises an onboard interface unit operable to execute instructions for:
      sending and receiving data from the tactical transceiver;
      sending and receiving data from off-board transceiver;
      sending and receiving data from onboard transceiver; and
      integrating two-way communications received from at least one SATCOM network with communications received from the at least one tactical communication service which are presented by the onboard communication system.

2. The systom of claim 1, wherein said onboard transceiver is a commercial off-the-shelf transceiver.

3. The system of claim 1, wherein said communications system further comprises an intercom and the onboard interface unit further comprises a sound-card coupled to said computer processor and said intercom, the sound card being capable of:
   exchanging two-way communications with said computer processor; and
   communicating two-way analog voice data with said intercom.

4. The system of claim 1, wherein said onboard interface unit comprises a video card coupled to said processor and said display, wherein said video card is capable of:
   sending and receiving data from the computer process; and
   sending and receiving data from the display.

5. The system of claim 4, wherein the video card is capable of communicating SVGA data and/or RS-170 data.

6. The system of claim 4, wherein the display is a multi-function display set.

7. The system of claim 1, wherein the communications system further comprises a radio coupled to the computer processor, the computer processor capable exchanging two-way communications with the radio.

8. The system of claim 7, wherein the radio is a UHF/VHF radio.

9. The system of claim 7, wherein said commercial transceiver further comprises an improved data modem in electrical connection with the radio and the computer processor, whereby the computer processor communicates two-way data with the radio.

10. The system of claim 1, wherein the communications system further comprises a mission data processor in electrical connection with the computer processor, the mission data processor capable of exchanging two-way communications exchanging two-way communications with the computer processor.

11. The system of claim 10, wherein the onboard integration unit further comprises a bus in electrical connection with the mission data processor and the computer processor, whereby the computer processor communicates data with the mission data processor.

12. The system of claim 11, wherein the bus is a Mil-Std-1553 bus.

13. The system of claim 1, wherein the onboard interface unit further comprises a navigation system in electrical connection with the computer processor and an antenna, wherein the navigation system and the computer processor are capable of exchanging two-way communications with each other.

14. The system of claim 1, wherein threat, weather, target, voice, and/or ejection data is communicated.

15. The system of claim 1, wherein the onboard interface unit further comprises a commercial SATCOM control capable of sending to and receiving control information from the onboard commercial transceiver and capable of sending to and receiving control data from the computer processor.

16. An apparatus operable to integrate commercial satellite communication (SATCOM) with tactical (line of sight (LOS)) communications comprising;
    a commercial SATCOM transceiver;
    a tactical communications system;
    an interface unit operably coupled to the commercial SATCOM transceiver and the tactical communication system wherein the interface unit further comprises a:
        a computer processor in electrical connection with the commercial SATOOM transceiver, capable of:
        sending and receiving data from the commercial SATCOM transceiver; and
        processing the data; and
        a sound card in electrical connection with the computer processor and an intercom, the sound card capable of;
        sending and receiving data from the computer processor,
        sending and receiving voice analog data from an intercom; and
        processing data.

17. The apparatus of claim 16, further comprising:
    a video card in electrical connection with the computer processor and a display, wherein the video card capable of:
        exchanging two-way communications with the computer processor;
        communicating video data with the display; and
        processing data.

18. The apparatus of claim 17, wherein the video card is an SVGA video card or RS-170.

19. The apparatus of claim 17, wherein the display is a multi-function display set or commercial display.

20. The apparatus of claim 16, wherein the computer processor is in electrical connection with a radio, the computer processor is capable of communicating two way voice data with a radio.

21. The apparatus of claim 20, wherein the radio is a UHF/VHF radio.

22. The apparatus of claim 20, further comprising an improved data modem in electrical connection with the computer processor and the radio, whereby the computer processor communicates two-way data with the radio.

23. The apparatus of claim 16, wherein the computer processor is in electrical connection with a mission data processor, wherein the mission data processor capable of exchanging two-way communications with the computer processor.

24. The apparatus of claim 16, further comprising a bus in electrical connection with the computer processor and the mission data processor, whereby the computer processor communicates with the mission data processor.

25. The apparatus of claim 24, wherein the bus is a Mil-Std-1553 bus.

26. The apparatus of claim 16, further comprising a navigation system in electrical connection with an antenna and the computer processor, wherein the navigation system is capable of communicating data with the computer processor.

27. The apparatus of claim 26, wherein the navigation system is a GPS system.

28. The apparatus of claim 16, further comprising a storage device in electrical communication with the computer processor, wherein the computer processor capable of exchanging two-way communications with the storage device.

29. The apparatus of claim 28, wherein the storage device is a flash hard drive.

30. The apparatus of claim 16, further comprising a voltage converter in electrical connection with computer processor, the voltage converter capable of providing electrical power to the computer processor.

31. The apparatus of claim 24, further comprising a test port in electrical connection with the computer processor.

32. The apparatus of claim 31, wherein the test port is a RS-232 port.

* * * * *